(12) United States Patent
Hayashi et al.

(10) Patent No.: US 12,044,615 B2
(45) Date of Patent: Jul. 23, 2024

(54) BIOLOGICAL COMPONENT MEASUREMENT DEVICE AND BIOLOGICAL COMPONENT MEASUREMENT METHOD

(71) Applicant: Mitsubishi Electric Corporation, Tokyo (JP)

(72) Inventors: Shusaku Hayashi, Tokyo (JP); Koichi Akiyama, Tokyo (JP); Yuki Tsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/282,233

(22) PCT Filed: Mar. 23, 2021

(86) PCT No.: PCT/JP2021/011966
§ 371 (c)(1),
(2) Date: Sep. 15, 2023

(87) PCT Pub. No.: WO2022/201301
PCT Pub. Date: Sep. 29, 2022

(65) Prior Publication Data
US 2024/0151636 A1    May 9, 2024

(51) Int. Cl.
*G01N 21/17*    (2006.01)
(52) U.S. Cl.
CPC ................. *G01N 21/171* (2013.01)
(58) Field of Classification Search
CPC ................................................. G01N 21/171

(Continued)

(56) References Cited

U.S. PATENT DOCUMENTS 3,902,807 A * 9/1975 Fleming ............... G01N 21/552
  250/343
4,576,173 A * 3/1986 Parker .................. A61B 5/0059
  600/431

(Continued)

FOREIGN PATENT DOCUMENTS

CN      106535760 A    3/2017
JP     2001-500037 A    1/2001

(Continued)

OTHER PUBLICATIONS

International Search Report and Written Opinion mailed on Jun. 8, 2021, received for PCT Application PCT/JP2021/011966, filed on Mar. 23, 2021, 11 pages including English Translation.

(Continued)

*Primary Examiner* — Isiaka O Akanbi
(74) *Attorney, Agent, or Firm* — XSENSUS LLP

(57) ABSTRACT

In a biological component measurement device according to the present disclosure, a modulation unit intensity-modulates excitation light emitted from an excitation light source and the intensity-modulated excitation light is incident to an optical medium. The modulation unit switches a plurality of modulation frequencies in order from a low frequency to a high frequency. The plurality of modulation frequencies include a first frequency and a second frequency higher than the first frequency. A light position detector detects a position of probe light when the sample is irradiated with excitation light intensity-modulated at the first frequency and a position of probe light when the sample is irradiated with excitation light intensity-modulated at the second frequency. The biological component acquisition unit measures a biological component of the sample based on the position of the probe light at the first frequency and the position of the probe light at the second frequency.

9 Claims, 5 Drawing Sheets

(58) Field of Classification Search
USPC .................... 356/445, 448, 432, 317, 364
See application file for complete search history.

(56) References Cited

U.S. PATENT DOCUMENTS

| | | | | |
|---|---|---|---|---|
| 5,379,109 | A * | 1/1995 | Gaskill | G01N 21/1717 |
| | | | | 257/E21.531 |
| 5,586,824 | A * | 12/1996 | Barkyoumb | G01N 25/18 |
| | | | | 73/159 |
| 5,871,442 | A | 2/1999 | Madarasz et al. | |
| 6,108,087 | A | 8/2000 | Nikoonahad et al. | |
| 6,236,870 | B1 | 5/2001 | Madarasz et al. | |
| 6,549,285 | B1 | 4/2003 | Wright et al. | |
| 6,552,799 | B1 | 4/2003 | Wright et al. | |
| 6,552,800 | B1 | 4/2003 | Wright et al. | |
| 6,552,803 | B1 | 4/2003 | Wang et al. | |
| 6,591,121 | B1 | 7/2003 | Madarasz et al. | |
| 6,636,752 | B1 | 10/2003 | Madarasz et al. | |
| 8,970,838 | B2 * | 3/2015 | Messerschmidt | G01N 21/65 |
| | | | | 356/73 |
| 10,261,011 | B2 * | 4/2019 | Bauer | G01N 33/4833 |
| 10,883,933 | B2 * | 1/2021 | Mäntele | G01N 33/18 |
| 11,639,894 | B2 * | 5/2023 | Mäntele | A61B 5/14532 |
| | | | | 600/316 |
| 2001/0029323 | A1 | 10/2001 | Madarasz et al. | |
| 2002/0095075 | A1 | 7/2002 | Madarasz et al. | |
| 2002/0158212 | A1 * | 10/2002 | French | B01L 3/50853 |
| | | | | 252/301.16 |
| 2003/0127609 | A1 * | 7/2003 | El-Hage | G01N 21/6452 |
| | | | | 250/574 |
| 2007/0015978 | A1 | 1/2007 | Kanayama et al. | |
| 2010/0281981 | A1 | 11/2010 | Tas et al. | |
| 2017/0131204 | A1 | 5/2017 | Sieben et al. | |
| 2017/0146455 | A1 * | 5/2017 | Mäntele | G01N 21/636 |
| 2018/0003619 | A1 | 1/2018 | Sieben et al. | |
| 2018/0238794 | A1 * | 8/2018 | Kangas | G02B 27/0018 |
| 2020/0060549 | A1 | 2/2020 | Enoki et al. | |
| 2021/0164928 | A1 * | 6/2021 | Lubinski | A61B 5/14532 |

FOREIGN PATENT DOCUMENTS

| | | |
|---|---|---|
| JP | 2001-228121 A | 8/2001 |
| JP | 2001-228122 A | 8/2001 |
| JP | 2001-228123 A | 8/2001 |
| JP | 2002-505427 A | 2/2002 |
| JP | 2004-147940 A | 5/2004 |
| JP | 2006-122579 A | 5/2006 |
| JP | 2010-520616 A | 6/2010 |
| JP | 2012-052997 A | 3/2012 |
| JP | 2012-052998 A | 3/2012 |
| JP | 2017-519214 A | 7/2017 |
| WO | 2004/053466 A1 | 6/2004 |
| WO | 2018/123169 A1 | 7/2018 |

OTHER PUBLICATIONS

Decision to Grant mailed on Sep. 7, 2021, received for JP Application 2021-541424, 8 pages including English Translation.
Office Action issued Mar. 12, 2024, in corresponding Chinese Patent Application No. 202180095878.6, 20pp.

* cited by examiner

FIG.4
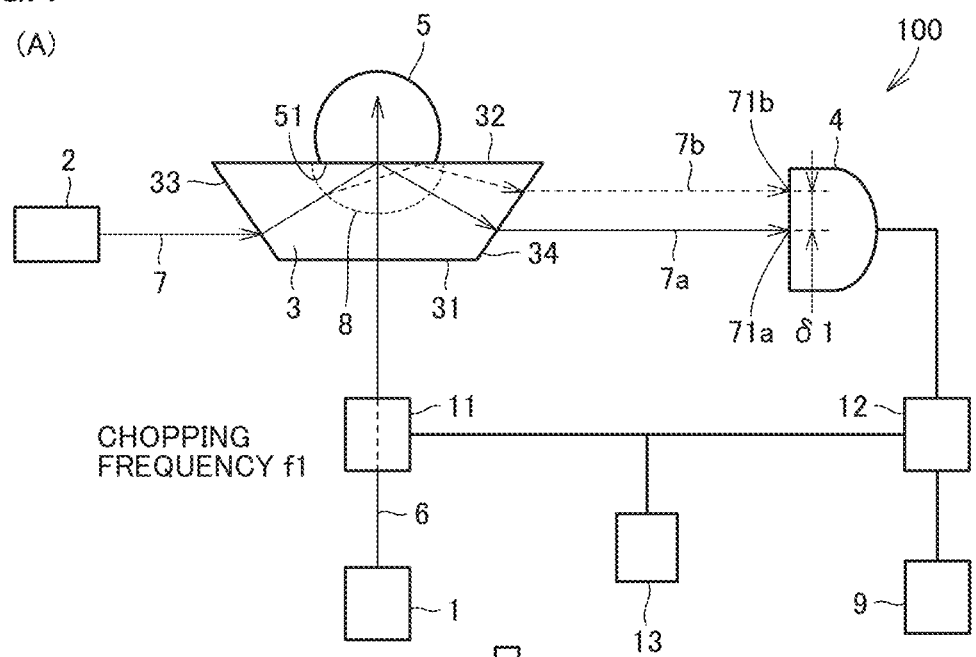
(A)
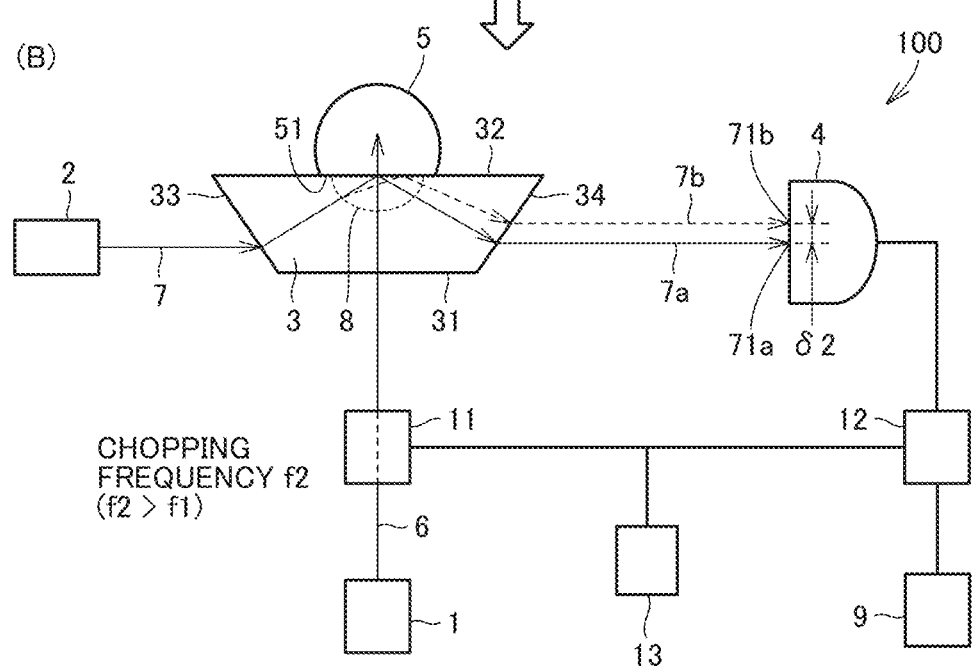
(B)

BIOLOGICAL COMPONENT MEASUREMENT DEVICE AND BIOLOGICAL COMPONENT MEASUREMENT METHOD

CROSS-REFERENCE TO RELATED APPLICATION

The present application is based on PCT filing PCT/JP2021/011966, filed Mar. 23, 2021, the entire contents of which is incorporated herein by reference.

TECHNICAL FIELD

The present disclosure relates to a biological component measurement device and a biological component measurement method.

BACKGROUND ART

Japanese National Patent Publication No. 2017-519214 (PTL 1) discloses a noninvasive analysis system including an optical medium, an infrared light source, a probe light source, and a photodiode. Specifically, a biological sample is placed on a surface of the optical medium. The infrared light source emits infrared light. The infrared light travels through the optical medium to illuminate the biological sample. The infrared light is absorbed by the biological sample to cause the biological sample to generate heat. The amount of absorption heat of the biological sample varies in a manner that depends on the amount or concentration of a biological component present in the sample or on the surface of the sample.

The probe light source emits, toward the optical medium, probe light that is visible light. The probe light is totally internally reflected at an interface between the optical medium and the biological sample to outgo from the optical medium. The absorption heat of the biological sample transfers to the optical medium to change a refractive index of the optical medium. The change in refractive index of the optical medium affects total internal reflection of the probe light at the interface between the optical medium and the biological sample to change a traveling direction of the probe light that outgoes from the optical medium. The photodiode detects a change in the traveling direction of the probe light. The amount or concentration of a biological component is measured based on the change in the traveling direction of the probe light detected by the photodiode. For example, when the sample is a skin of a patient, a blood glucose level of the patient is measured as a biological component.

CITATION LIST

Patent Literature

PTL 1: Japanese National Patent Publication No. 2017-519214

SUMMARY OF INVENTION

Technical Problem

In the noninvasive analysis system described in PTL 1, an optical chopper is disposed between the infrared light source and the optical medium. Infrared light (continuous light) emitted from the infrared light source is intensity-modulated by the optical chopper, and the biological sample is irradiated with the infrared light. The biological sample is irradiated with pulsed light that is turned on and off at a cycle corresponding to a chopping frequency of the optical chopper.

In PTL 1, the biological sample is irradiated with the infrared light intensity-modulated at a different adjustment frequency. The adjustment frequency of the high frequency results in an absorption process in a region closer to the surface of the biological sample, while the adjustment frequency of the low frequency results in the absorption process in a deeper layer of the biological sample. The noninvasive analysis system is configured to analyze different layers of the skin of the patient based on the change in the traveling direction of the probe light detected at each of the different adjustment frequencies.

In the above noninvasive analysis system, in order to accurately measure the biological component, the biological sample is required to be disposed at an optimum position where the absorption heat of the biological sample is stably and efficiently transmitted to the optical medium. Accordingly, at a start of measurement, the position of the biological sample on the surface of the optical medium is adjusted. In the position adjustment of the biological sample, a change in the traveling direction of the probe light is detected using a photodiode while the biological sample is irradiated with the infrared light intensity-modulated at a predetermined frequency. However, because the absorption heat of the biological sample becomes smaller as the adjustment frequency becomes higher, the absorption heat of the biological sample is not sufficiently transmitted to the optical medium, and it becomes difficult to determine whether the position of the biological sample is optimal. As a result, there is a possibility that measurement accuracy is degraded.

Furthermore, in the configuration in which the optical chopper is used for the intensity modulation of the infrared light like PTL 1, there is a problem that it takes more time to adjust the modulation frequency in a case where the modulation frequency is changed from a high frequency to a low frequency than in a case where the modulation frequency is changed from the low frequency to the high frequency due to a structure of the optical chopper.

The present disclosure has been made to solve the above problems, and an object of the present disclosure is to provide a biological component measurement device and a biological component measurement method capable of measuring the biological component with high accuracy and high efficiency.

Solution to Problem

A biological component measurement device according to the present disclosure includes: an optical medium to include a sample placement surface; an excitation light source to emit excitation light traveling in the optical medium toward a sample placed on the sample placement surface; a probe light source to emit probe light traveling in the optical medium; a light position detector to detect a position of the probe light emitted from the optical medium; a biological component acquisition unit connected to the light position detector; and a modulation unit to modulate intensity of the excitation light and to make the excitation light incident on the optical medium. In plan view of the sample placement surface, an optical path of the probe light in the optical medium overlaps a part of the sample placement surface irradiated with the excitation light. The modulation unit is configured to switch a plurality of modulation frequencies in order from a low frequency to a high frequency. The plurality of modulation frequencies include a first frequency and a second frequency higher than the first frequency. The light position detector detects the position of the probe light when the sample is irradiated with the excitation light intensity-modulated at the first frequency. The light position detector detects the position of the probe light when the sample is irradiated with the excitation light intensity-modulated at the second frequency. The biological component acquisition unit measures a biological component of the sample based on the position of the probe light at the first frequency and the position of the probe light at the second frequency.

A biological component measurement method according to the present disclosure is a biological component measurement method for measuring a biological component of a sample. The biological component measurement method includes: setting a modulation frequency in intensity modulation of excitation light to a first frequency; detecting a position of probe light emitted from an optical medium while emitting probe light traveling in the optical medium and irradiating the sample placed on a sample placement surface of the optical medium with the excitation light intensity-modulated at the first frequency; changing the modulation frequency in the intensity modulation from the first frequency to a second frequency higher than the first frequency; detecting the position of the probe light emitted from the optical medium while emitting the probe light traveling in the optical medium and emitting the excitation light intensity-modulated at the second frequency toward the sample placed on the sample placement surface of the optical medium; and measuring the biological component of the sample based on the position of the probe light at the first frequency and the position of the probe light at the second frequency.

Advantageous Effects of Invention

According to the present disclosure, the biological component measurement device and the biological component measurement method capable of measuring the biological component with high accuracy and high efficiency can be provided.

BRIEF DESCRIPTION OF DRAWINGS

FIG. 4 is a view illustrating the biological component measurement method of the first embodiment.

DESCRIPTION OF EMBODIMENTS

Figure 1:
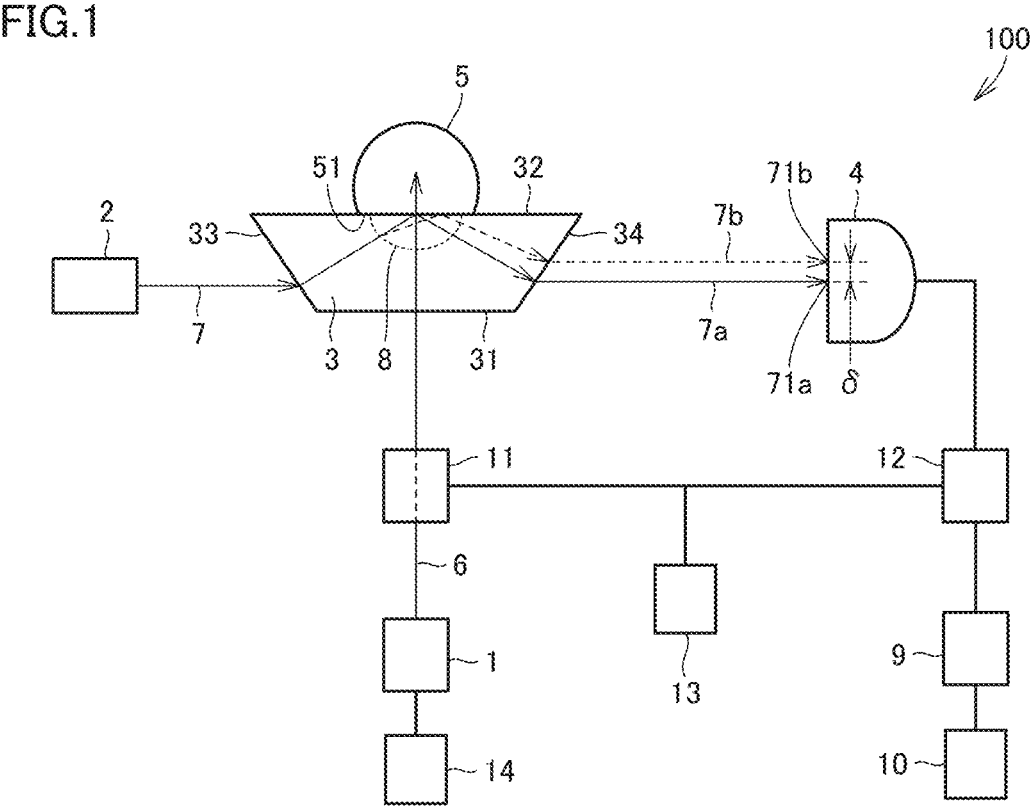
FIG. 1 is a view illustrating a configuration of a biological component measurement device according to a first embodiment.

With reference to the drawings, an embodiment of the present disclosure will be described in detail below. In the drawings, the same or corresponding portion is denoted by the same reference numeral, and the description will not be repeated in principle.

First Embodiment

FIG. 1 is a view illustrating a configuration of a biological component measurement device according to a first embodiment. A biological component measurement device 100 of the first embodiment is a device that non-invasively measures a biological component of a sample 5.

As illustrated in FIG. 1, biological component measurement device 100 of the first embodiment includes an excitation light source 1, a probe light source 2, an optical medium 3, a light position detector 4, a biological component acquisition unit 9, a recording unit 10, an optical chopper 11, a lock-in amplifier 12, an oscillator 13, and a power supply 14.

Optical medium 3 includes a first surface 31, a second surface 32 located on than opposite side of first surface 31, a third surface 33 connecting first surface 31 and second surface 32, and a fourth surface 34 that connects first surface 31 and second surface 32 and is located on an opposite side of third surface 33.

First surface 31 of optical medium 3 is an incident surface of excitation light 6 emitted from excitation light source 1. Second surface 32 is a sample placement surface. A sample 5 is placed on second surface 32 and is in contact with second surface 32. Sample 5 is, for example, a skin or a body fluid of a patient. When a liquid is to be measured, sample 5 is a liquid contained in a transparent sample holder. Third surface 33 is an incident surface of probe light 7 emitted from probe light source 2. A normal direction of third surface 33 is inclined with respect to the incident direction of probe light 7. Fourth surface 34 is an emission surface of probe light 7. Fourth surface 34 is inclined with respect to the emission direction of probe light 7. For example, optical medium 3 may be a total internal reflection prism (TIR prism).

Optical medium 3 is transparent to excitation light 6. In the present specification, the fact that optical medium 3 is transparent to excitation light 6 means that light transmittance of optical medium 3 with respect to excitation light 6 is greater than or equal to 25%. The light transmittance of optical medium 3 with respect to excitation light 6 may be greater than or equal to 50%, may be greater than or equal to 75%, or may be greater than or equal to 90%.

Optical medium 3 is transparent to probe light 7. In the present specification, the fact that optical medium 3 is transparent to probe light 7 means that the light transmittance of optical medium 3 with respect to probe light 7 is greater than or equal to 25%. The light transmittance of optical medium 3 with respect to probe light 7 may be greater than or equal to 50%, may be greater than or equal to 75%, or may be greater than or equal to 90%.

Optical medium 3 is formed from a material having thermal conductivity of less than or equal to 15.0 W/(m·K). The thermal conductivity of the material of optical medium 3 may be less than or equal to 10.0 W/(m·K), less than or equal to 5.0 W/(m·K), less than or equal to 3.0 W/(m·K), less than or equal to 2.0 W/(m·K), or less than or equal to 1.0 W/(m·K). The thermal conductivity of the material of optical medium 3 is greater than or equal to 0.5 times the thermal conductivity of sample 5. The thermal conductivity of the material of optical medium 3 may be greater than or equal to 0.75 times the thermal conductivity of sample 5, may be greater than or equal to the thermal conductivity of sample 5, may be greater than or equal to 1.5 times the thermal conductivity of sample 5, or may be greater than or equal to 2.0 times the thermal conductivity of sample 5.

Optical medium 3 is formed from chalcogenide glass. For example, the chalcogenide glass contains greater than or equal to 2 mol % and less than or equal to 22 mol % of germanium (Ge), greater than or equal to 6 mol % and less than or equal to 34 mol % of at least one element selected from the group consisting of antimony (Sb) and bismuth (Bi), greater than or equal to 1 mol % and less than or equal to 20 mol % of tin (Sn), and greater than or equal to 58 mol % and less than or equal to 70 mol % of at least one element selected from the group consisting of sulfur (S), selenium (Se), and tellurium (Te). The chalcogenide glass has a thermal conductivity of 0.36 W/(m·K).

Excitation light source 1 receives power supply from power supply 14 and emits excitation light 6 toward sample 5 placed on the sample placement surface (second surface 32). Excitation light 6 is emitted from excitation light source 1 and is incident on optical medium 3 from first surface 31. Excitation light 6 travels through optical medium 3 and enters sample 5 from second surface 32. Excitation light 6 is absorbed by a biological component existing in sample 5 or on a surface 51 of sample 5. For example, when a blood glucose level of a patient is measured using biological component measurement device 100, the biological component is glucose existing in an interstitial fluid in epidermis. The absorption of excitation light 6 by the biological component generates absorption heat in sample 5. The absorption heat of sample 5 transfers to optical medium 3. When a temperature gradient region is generated in optical medium 3, a refractive index gradient region 8 is generated in optical medium 3.

A wavelength of excitation light 6 is determined according to an absorption wavelength of the biological component existing in sample 5 or on surface 51 of sample 5. The wavelength of excitation light 6 may be longer than the wavelength of probe light 7. For example, the wavelength of excitation light 6 is greater than or equal to 6.0 μm. The wavelength of excitation light 6 may be greater than or equal to 8.0 μm. For example, the wavelength of excitation light 6 is less than or equal to 13.0 μm. The wavelength of excitation light 6 may be less than or equal to 11.0 μm. Excitation light 6 may be light having a plurality of wavelengths. For example, when the blood glucose level of the patient is measured using biological component measurement device 100, the wavelength of excitation light 6 falls within a wavelength range including a wavelength of a fingerprint spectrum of glucose (for example, a wavelength range of greater than or equal to 8.5 μm to less than or equal to 10 μm). For example, excitation light source 1 is a quantum cascade laser capable of emitting broadband infrared light. In the following description, it is assumed that excitation light 6 is light having three wavelengths $\lambda 1$, $\lambda 2$, $\lambda 3$. The light having wavelengths $\lambda 1$, $\lambda 2$ is absorbed by a biological component existing in sample 5 or on surface 51 of sample 5. The light having wavelength $\lambda 3$ is not absorbed by the biological component but is used as reference light.

Probe light source 2 emits probe light 7. Probe light 7 is incident on optical medium 3 from third surface 33 of optical medium 3. Probe light 7 is refracted by third surface 33 and travels through optical medium 3 toward the interface between optical medium 3 (second surface 32) and sample 5. In planar view of the sample placement surface (second surface 32), an optical path of probe light 7 in optical medium 3 overlaps a portion of the sample placement surface (second surface 32) irradiated with excitation light 6. Probe light 7 is totally internally reflected at the interface between optical medium 3 (second surface 32) and sample 5. While probe light 7 is traveling through optical medium 3, probe light 7 travels through refractive index gradient region 8 generated in optical medium 3 by the absorption heat of sample 5. Probe light 7 is refracted by refractive index gradient region 8, and the traveling direction of probe light 7 changes accordingly. Probe light 7 (first emission probe light 7a and second emission probe light 7b) is emitted from fourth surface 34 of optical medium 3.

For example, the wavelength of probe light 7 is greater than or equal to 1100 nm. The wavelength of probe light 7 may be greater than or equal to 1300 nm. For example, the wavelength of probe light 7 is less than or equal to 1700 nm. Accordingly, an inexpensive semiconductor laser for use in optical communication such as an InGaAsP-based semiconductor laser or an InGaNAs-based semiconductor laser may be used as probe light source 2. Furthermore, probe light 7 is not visible light, so that a risk of damage to human eyes caused by probe light 7 can be reduced. For example, the output of probe light 7 is less than or equal to 5 mW. This makes it possible to reduce the risk of the damage to the human eyes caused by probe light 7.

Light position detector 4 detects the position of probe light 7 emitted from optical medium 3. FIG. 1 illustrates a first position 71a of the probe light (first emission probe light 7a) when sample 5 is not irradiated with excitation light 6 and a second position 71b of the probe light (second emission probe light 7b) when sample 5 is irradiated with excitation light 6.

In a state where sample 5 is not irradiated with excitation light 6 (hereinafter, also referred to as a "reference state"), no absorption heat is generated in sample 5. Accordingly, a temperature gradient region is not generated in optical medium 3, and refractive index gradient region 8 is not generated in optical medium 3. Consequently, as indicated by a solid line in the figure, probe light 7 (first emission probe light 7a) in optical medium 3 is emitted from fourth surface 34 of optical medium 3 without being refracted in refractive index gradient region 8. First position 71a of the probe light (first emission probe light 7a) is the position of probe light 7 in the reference state and corresponds to the "reference position".

Light position detector 4 detects second position 71b of the probe light (second emission probe light 7b) when sample 5 is irradiated with excitation light 6. In the state where sample 5 is irradiated with excitation light 6, refractive index gradient region 8 is generated in optical medium 3 as described above. Therefore, as indicated by a broken line in the figure, the probe light (second emission probe light 7b) is refracted by refractive index gradient region 8 in optical medium 3 and emitted from fourth surface 34 of optical medium 3. Second position 71b of probe light 7 (second emission probe light 7b) is a position of probe light 7 detected by light position detector 4 when sample 5 is irradiated with excitation light 6. When sample 5 is irradiated with excitation light 6, the position of probe light 7 detected by light position detector 4 is displaced from first position 71a (reference position) to second position 71b.

Light position detector 4 outputs a signal related to second position 71b of probe light 7 (second emission probe light 7b) when sample 5 is irradiated with excitation light 6. For example, light position detector 4 is a photodiode or a semiconductor position detection element.

Biological component acquisition unit 9 is connected to light position detector 4. Biological component acquisition unit 9 acquires a displacement amount δ of probe light 7, which is the distance between first position 71a (reference position) and second position 71b, and obtains the amount or concentration of the biological component in sample 5 or on surface 51 of sample 5 from acquired displacement amount S. Recording unit 10 records the amount or concentration of the biological component obtained by biological component acquisition unit 9. For example, biological component acquisition unit 9 and recording unit 10 are one of functions implemented by an arithmetic processing unit.

Optical chopper 11 is disposed in the optical path of excitation light 6. Optical chopper 11 chops excitation light 6 (continuous light) emitted from excitation light source 1 at an arbitrary frequency. Excitation light 6 becomes intermittent light (pulse light) that is turned on and off at the cycle corresponding to the chopping frequency (frequency at which light is turned on and off) of optical chopper 11, and is incident on optical medium 3. Optical chopper 11 corresponds to an example of the "modulation unit" that modulates the intensity of excitation light 6. The chopping frequency of optical chopper 11 corresponds to an example of the "modulation frequency" that modulates the intensity of excitation light 6.

A known configuration can be applied to optical chopper 11. For example, optical chopper 11 includes a rotating disk in which an opening that allows the passage of excitation light 6 and a light shielding portion that blocks excitation light 6 are arranged in a circumferential direction, and a motor that rotates the rotating disk. When the rotary disk is periodically rotated by the motor, whether to irradiate sample 5 with excitation light 6 can be switched. That is, excitation light 6 undergoes intensity modulation at the chopping frequency of optical chopper 11. The chopping frequency of excitation light 6 is determined by a rotation speed of the rotating disk.

Oscillator 13 is connected to optical chopper 11 and lock-in amplifier 12. Oscillator 13 sets the chopping frequency (modulation frequency) of optical chopper 11. Oscillator 13 generates a control signal for chopper control of excitation light 6, and gives the generated control signal to optical chopper 11 and lock-in amplifier 12. The control signal includes the chopping frequency of optical chopper 11.

Lock-in amplifier 12 is connected to oscillator 13 and light position detector 4. Lock-in amplifier 12 selectively amplifies a signal synchronized with the chopping frequency (modulation frequency) of optical chopper 11 among the signals related to the position of probe light 7 output from light position detector 4 based on the control signal given from oscillator 13.

Specifically, lock-in amplifier 12 outputs the signal obtained by amplifying a difference between the position of probe light 7 in an on-period of a chopping cycle of optical chopper 11 and the position of probe light 7 in an off-period of the chopping cycle.

The on-period of the chopping cycle corresponds to a period in which excitation light 6 is emitted. Therefore, the position of probe light 7 during the on-period corresponds to second position 71b. The off-period of the chopping cycle corresponds to a period in which excitation light 6 is not emitted. Accordingly, the position of probe light 7 in the off-period corresponds to first position 71a (reference position). Lock-in amplifier 12 generates the signal related to displacement amount $\delta$ of probe light 7, which is the distance between first position 71a (reference position) and second position 71b, based on the output signal of light position detector 4.

The output signal of lock-in amplifier 12 is obtained by removing a noise included in the signal related to the position of probe light 7 output from light position detector 4. This enables biological component measurement device 100 to measure the biological component with improved accuracy.

The operation frequencies of optical chopper 11 and lock-in amplifier 12 may be synchronized by directly connecting optical chopper 11 and lock-in amplifier 12 without using oscillator 13 and exchanging signals with each other.

A biological component measurement method using biological component measurement device 100 in FIG. 1 will be described below.

Figure 2:
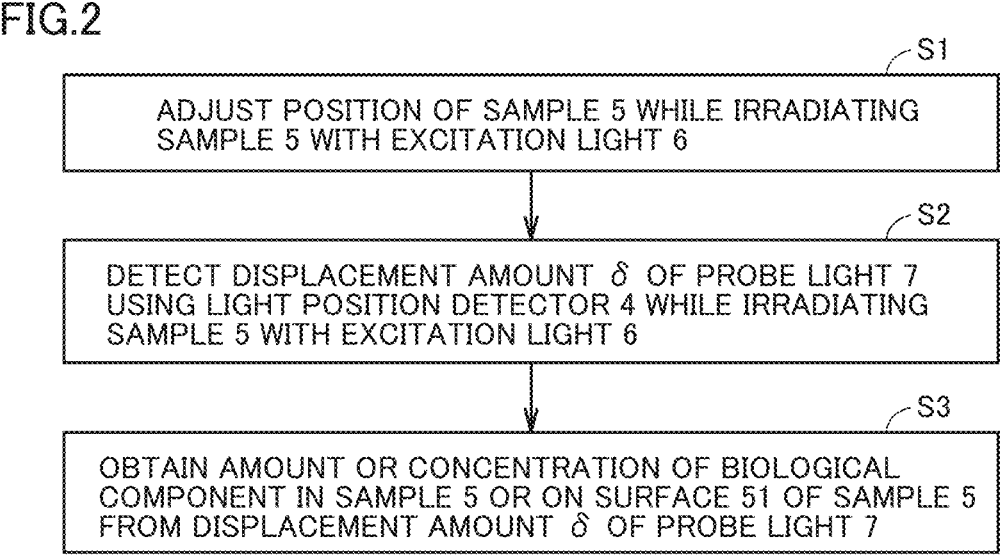
FIG. 2 is a flowchart illustrating a basic concept of the biological component measurement method of the first embodiment.

FIG. 2 is a flowchart illustrating a basic concept of the biological component measurement method of the first embodiment.

The biological component measurement method of the first embodiment includes step (S1) of adjusting the position of sample 5 on the sample placement surface (second surface 32) while irradiating sample 5 with excitation light 6. This is because sample 5 is required to be disposed at an optimum position where the absorption heat of sample 5 is stably and efficiently transferred to optical medium 3 in order to accurately measure the biological component of sample 5. In particular, when sample 5 is a finger of the patient and has a minute bump such as a fingerprint on the surface of the finger, the position of sample 5 is required to be adjusted also from the viewpoint of securing the contact pressure of sample 5 to optical medium 3.

In step (S1), the position of sample 5 with respect to excitation light 6 and probe light 7 in the traveling direction of probe light 7 is adjusted using light position detector 4 while irradiating sample 5 with excitation light 6.

As described above, excitation light 6 with which sample 5 is irradiated is absorbed by the biological component in sample 5 or on surface 51 of sample 5. The absorption of excitation light 6 by the biological component generates absorption heat in sample 5. When the absorption heat of sample 5 is conducted to optical medium 3, the temperature gradient region is generated in optical medium 3. Accordingly, refractive index gradient region 8 is generated in optical medium 3. Probe light 7 is refracted by refractive index gradient region 8 and emitted from optical medium 3. Light position detector 4 detects second position 71b of probe light 7 (second emission probe light 7b). When sample 5 is irradiated with excitation light 6, the position of probe light 7 detected by light position detector 4 is displaced from first position 71a (reference position) to second position 71b. Lock-in amplifier 12 generates the signal related to displacement amount $\delta$ of probe light 7, which is the distance between first position 71a (reference position) and second position 71b, based on the output signal of light position detector 4.

In step (S1), an operation of acquiring displacement amount $\delta$ of probe light 7 based on the output signal of lock-in amplifier 12 is repeatedly executed while the position of sample 5 is changed along the traveling direction of probe light 7, thereby searching for the position where displacement amount $\delta$ of probe light 7 is maximized. As a result of this search, the position where displacement amount $\delta$ of probe light 7 is maximized is determined as the position of sample 5.

The biological component measurement method of the first embodiment includes step (S2) of detecting displacement amount $\delta$ of probe light 7 using light position detector 4 while irradiating sample 5 with excitation light 6. In step (S2), sample 5 adjusted to the optimum position is irradiated with excitation light 6. Probe light 7 is refracted by refractive index gradient region 8 generated in optical medium 3 and emitted from optical medium 3. Light position detector 4 detects second position 71b of probe light 7 (second emission probe light 7b). Lock-in amplifier 12 generates the signal related to displacement amount δ of probe light 7, which is the distance between the reference position and second position 71b, based on the output signal of light position detector 4. The process of step (S2) can be performed continuously with the process of step (S1).

The biological component measurement method of the first embodiment includes step (S3) of obtaining the amount or concentration of the biological component existing in sample 5 or on surface 51 of sample 5 based on displacement amount δ of probe light 7. For example, recording unit 10 stores a data table in which the type of the biological component, displacement amount δ of probe light 7, and the amount or concentration of the biological component are associated with each other. Biological component acquisition unit 9 refers to the data table stored in recording unit 10 to obtain the amount or concentration of the biological component corresponding to the type of the biological component and displacement amount δ of probe light 7.

In biological component measurement device 100 of the first embodiment, the intensity of excitation light 6 is modulated by optical chopper 11, and sample 5 is irradiated with excitation light 6. Excitation light 6 is intermittent light (pulse light) that is turned on and off at the cycle corresponding to the modulation frequency (the chopping frequency of optical chopper 11). An irradiation time per cycle of excitation light 6 changes according to the modulation frequency. The lower the modulation frequency, the longer the irradiation time per cycle.

On the other hand, a penetration depth of excitation light 6 into sample 5 changes as the irradiation time per cycle changes. Specifically, as the irradiation time becomes longer, the penetration depth of excitation light 6 becomes deeper. Accordingly, the lower the modulation frequency, the longer the irradiation time per cycle, so that the penetration depth of excitation light 6 into sample 5 becomes deeper.

For example, when sample 5 is a skin of the patient, sample 5 is composed of an epidermal tissue, a dermal tissue existing in a lower layer of the epidermal tissue, and a subcutaneous tissue existing in a lower layer of the dermal tissue. The epidermal tissue contains the keratin as a main component, the dermal tissue contains interstitial fluid and cells as components, and the subcutaneous tissue contains fat as a main component. When the modulation frequency is high, the irradiation time per cycle is short, so that the penetration depth of excitation light 6 into sample 5 becomes shallow. Accordingly, the information obtained by the measurement is mainly information about the epidermal tissue.

On the other hand, when the modulation frequency is low, because the irradiation time per cycle is long, the penetration depth of excitation light 6 with respect to sample 5 becomes deeper. Accordingly, the information obtained by the measurement is information obtained by synthesizing the information about the epidermal tissue and the information about the dermal tissue. As the modulation frequency decreases, the irradiation time per cycle becomes longer, and the penetration depth of excitation light 6 becomes deeper, so that a ratio of the information about the dermal tissue included in the information obtained by the measurement increases.

When the blood glucose level of the patient is measured using biological component measurement device 100, because the biological component is a sugar existing in the tissue interstitial fluid in the dermal tissue, the information about the dermal tissue is required to be acquired. However, as described above, the information obtained by the measurement includes the information about the epidermal tissue, and the information about the epidermal tissue may be noise with respect to the information about the dermal tissue.

Accordingly, in the biological component measurement method of the first embodiment, the intensity modulation of excitation light 6 is performed for each modulation frequency by switching a plurality of modulation frequencies. Then, the information about the dermal tissue required for blood glucose level measurement is acquired based on a plurality of pieces of information obtained corresponding to the plurality of modulation frequencies.

Figure 3:
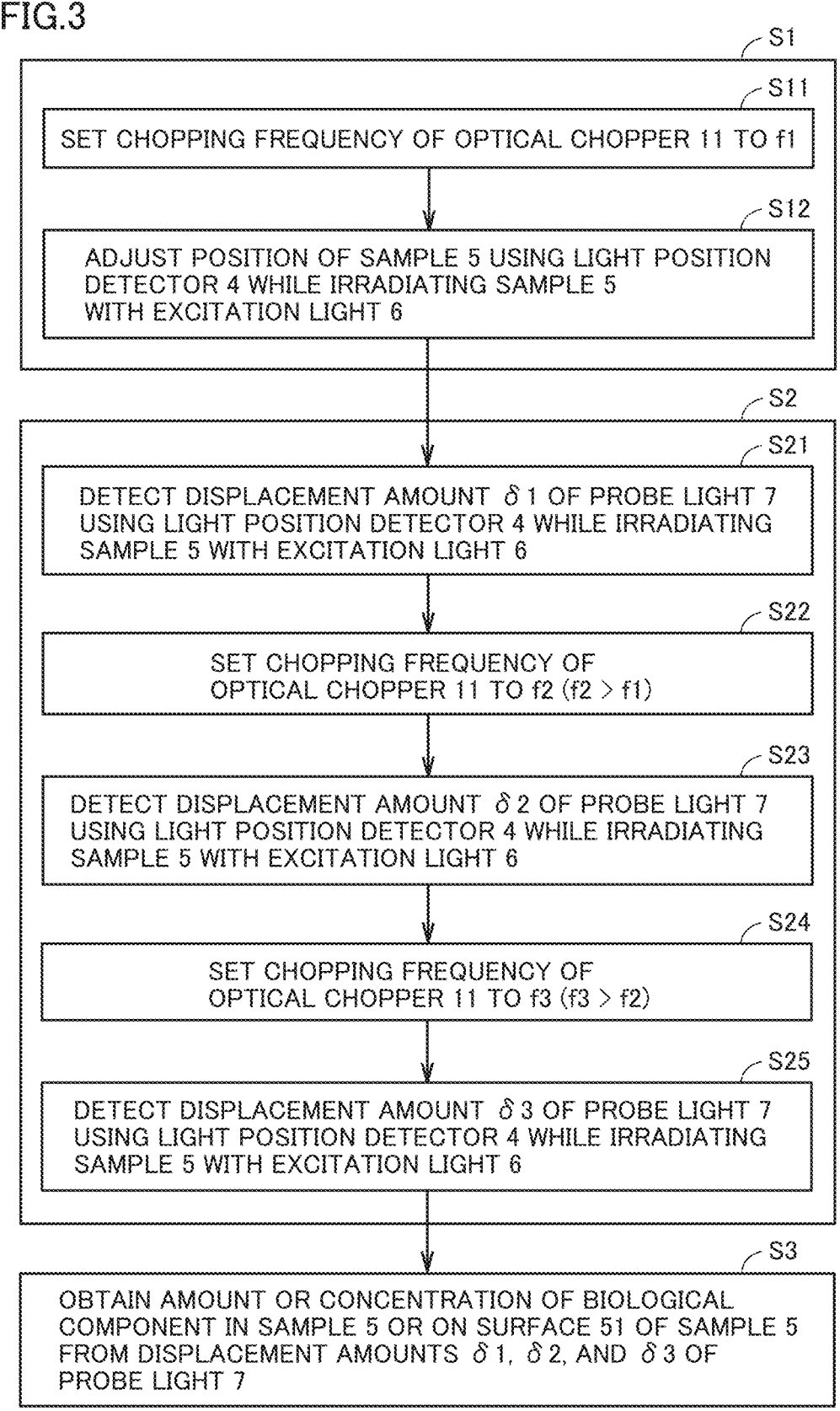
FIG. 3 is a flowchart illustrating the biological component measurement method of the first embodiment.

FIG. 3 is a flowchart illustrating the biological component measurement method of the first embodiment. FIG. 4 is a view illustrating the biological component measurement method of the first embodiment.

As described in FIG. 2, first, step (S1) of adjusting the position of sample 5 on the sample placement surface (second surface 32) is performed while irradiating sample 5 with excitation light 6.

Step (S1) includes a step of setting the chopping frequency (modulation frequency) of optical chopper 11 to a first frequency f1 using oscillator 13 (S11). Oscillator 13 generates a control signal based on the set chopping frequency (first frequency f1), and gives the generated control signal to optical chopper 11 and lock-in amplifier 12. Excitation light 6 undergoes the intensity modulation at the chopping frequency (first frequency f1) of optical chopper 11.

Step (S1) includes step (S12) of adjusting the position of sample 5 using light position detector 4 while irradiating sample 5 with excitation light 6 intensity-modulated at first frequency f1. FIG. 4(A) is a view illustrating the optical path of probe light 7 (second emission probe light 7b) when sample 5 is irradiated with excitation light 6 intensity-modulated at first frequency f1.

As illustrated in FIG. 4(A), excitation light 6 intensity-modulated at first frequency f1 is absorbed by the biological component in sample 5 or on surface 51 of sample 5. When the absorption heat of sample 5 is conducted to optical medium 3, refractive index gradient region 8 is generated in optical medium 3. Probe light 7 is refracted by refractive index gradient region 8 and emitted from optical medium 3. Light position detector 4 detects second position 71b of probe light 7 (second emission probe light 7b). Lock-in amplifier 12 generates the signal related to displacement amount δ of probe light 7, which is the distance between first position 71a (reference position) and second position 71b, based on the output signal of light position detector 4.

In step (S12), the position of sample 5 is changed along the traveling direction of probe light 7 while the excitation light intensity-modulated at first frequency f1 is emitted, and the operation of acquiring displacement amount δ of probe light 7 based on the output signal of lock-in amplifier 12 is repeatedly executed, so that the position where displacement amount δ of probe light 7 is maximized is searched. As a result of this search, the position where displacement amount δ of probe light 7 is maximized is determined as the position of sample 5.

After the position of sample 5 is adjusted in step (S1), step (S2) of detecting displacement amount δ1 of probe light 7 using light position detector 4 while irradiating sample 5 with excitation light 6 is performed.

Step (S2) includes step (S21) of detecting displacement amount M of probe light 7 using light position detector 4 while irradiating sample 5 with excitation light 6 intensity-modulated at first frequency f1. That is, in step (S21), sample 5 is irradiated with excitation light 6 intensity-modulated at first frequency f1 that is the same as the chopping frequency used for the position adjustment of sample 5. Lock-in amplifier 12 generates the signal related to displacement amount δ1 of probe light 7 when sample 5 is irradiated with excitation light 6 intensity-modulated at first frequency f1 based on the output signal of light position detector 4.

Displacement amount M of probe light 7 is displacement amount δ of probe light 7 when sample 5 is irradiated with excitation light 6 intensity-modulated at first frequency f1. Displacement amount δ1 of probe light 7 corresponds to the information about the amount or concentration of the biological component in sample 5 or on surface 51 of sample 5. Displacement amount δ1 of probe light 7 is stored in recording unit 10.

Step (S2) includes step (S22) of setting the chopping frequency (modulation frequency) of optical chopper 11 to a second frequency f2 using oscillator 13. Second frequency f2 is higher than first frequency f1 (f2>f1). Oscillator 13 generates the control signal based on the set chopping frequency (second frequency f2), and gives the generated control signal to optical chopper 11 and lock-in amplifier 12. Excitation light 6 undergoes the intensity modulation at the chopping frequency (second frequency f2) of optical chopper 11.

Step (S2) includes step (S23) of detecting a displacement amount δ2 of probe light 7 using light position detector 4 while irradiating sample 5 with excitation light 6 intensity-modulated at second frequency f2. FIG. 4(B) is a view illustrating the optical path of probe light 7 (second emission probe light 7b) when sample 5 is irradiated with excitation light 6 intensity-modulated at second frequency f2.

As illustrated in FIG. 4(B), excitation light 6 intensity-modulated at second frequency f2 is absorbed by the biological component in sample 5 or on surface 51 of sample 5. The absorption of excitation light 6 by the biological component generates absorption heat in sample 5. When the absorption heat of sample 5 is conducted to optical medium 3, refractive index gradient region 8 is generated in optical medium 3. Probe light 7 (second emission probe light 7b) is refracted by refractive index gradient region 8 and emitted from optical medium 3. Light position detector 4 detects second position 71b of probe light 7 (second emission probe light 7b). Lock-in amplifier 12 generates the signal related to displacement amount δ2 of probe light 7 based on the output signal of light position detector 4.

Displacement amount δ2 of probe light 7 is displacement amount δ of probe light 7 when sample 5 is irradiated with excitation light 6 intensity-modulated at second frequency f2. Displacement amount δ2 of probe light 7 corresponds to the information about the amount or concentration of the biological component in sample 5 or on surface 51 of sample 5. Displacement amount δ2 of probe light 7 is stored in recording unit 10.

Step (S2) includes step (S24) of setting the chopping frequency (modulation frequency) of optical chopper 11 to a third frequency f3 using oscillator 13. Third frequency f3 is higher than second frequency f2 (f3>f2). Oscillator 13 generates the control signal based on the set chopping frequency (third frequency f3), and gives the generated control signal to optical chopper 11 and lock-in amplifier 12. Excitation light 6 undergoes the intensity modulation at the chopping frequency (third frequency f3) of optical chopper 11.

Step (S2) includes step (S25) of detecting a displacement amount δ3 of probe light 7 using light position detector 4 while irradiating sample 5 with excitation light 6 intensity-modulated at third frequency f3.

Excitation light 6 intensity-modulated at third frequency f3 is absorbed by the biological component in sample 5 or on surface 51 of sample 5. The absorption of excitation light 6 by the biological component generates absorption heat in sample 5. When the absorption heat of sample 5 is conducted to optical medium 3, refractive index gradient region 8 is generated in optical medium 3. Probe light 7 (second emission probe light 7b) is refracted by refractive index gradient region 8 and emitted from optical medium 3. Light position detector 4 detects second position 71b of probe light 7 (second emission probe light 7b). Lock-in amplifier 12 generates the signal related to displacement amount δ3 of probe light 7 based on the output signal of light position detector 4.

Displacement amount δ3 of probe light 7 is displacement amount δ of probe light 7 when sample 5 is irradiated with excitation light 6 intensity-modulated at third frequency f3. Displacement amount δ3 of probe light 7 corresponds to the information about the amount or concentration of the biological component in sample 5 or on surface 51 of sample 5. Displacement amount δ3 of probe light 7 is stored in recording unit 10.

Subsequently, step (S3) of obtaining the amount or concentration of the biological component in sample 5 or on surface 51 of sample 5 from the displacement amounts δ1, δ2, δ3 of probe light 7 obtained in steps S21, S23, S25 is performed. In this step (S3), Biological component acquisition unit 9 refers to the data table stored in recording unit 10 to obtain the amount or concentration of the biological component corresponding to the type of the biological component and displacement amounts δ1, δ2, δ3 of probe light 7.

As illustrated in FIG. 3, in the biological component measurement method of the first embodiment, the modulation frequency (the chopping frequency of optical chopper 11) is switched at a plurality of frequencies (first frequency f1, second frequency f2, and third frequency f3), second position 71b of probe light 7 (second emission probe light 7b) is detected while sample 5 is irradiated with excitation light 6 of each modulation frequency, and displacement amounts δ1, δ2, δ3 of the plurality of pieces of probe light 7 are obtained. The number of modulation frequencies is not limited to three, and may be two or greater than or equal to four.

As described above, because the irradiation time of excitation light 6 per cycle is different by changing the modulation frequency, the penetration depth of excitation light 6 with respect to sample 5 is different. In the example of FIG. 4, because first frequency f1 is lower than second frequency f2, the penetration depth of excitation light 6 into sample 5 becomes deeper. Because the absorption heat generated in sample 5 increases as the penetration depth of excitation light 6 increases, refractive index gradient region 8 generated in optical medium 3 also increases. As a result, displacement amount δ1 of probe light 7 becomes larger than displacement amount δ2 of probe light 7.

When sample 5 is the skin of the patient, displacement amount M (first information) of probe light 7 is obtained by measurement in which sample 5 is irradiated with excitation light 6 intensity-modulated at first frequency f1. The first information is information in which the information about the epidermal tissue and the information about the dermal tissue are synthesized. Furthermore, displacement amount δ2 (second information) of probe light 7 is obtained by measurement in which sample 5 is irradiated with excitation light 6 intensity-modulated at second frequency f2 lower than first frequency f1. The second information includes a lot of information about the epidermal tissue. In step S3, the information about the dermal tissue can be obtained by removing the second information from the first information. For example, the sugar amount corresponding to displacement amount δ1 and the sugar amount corresponding to displacement amount δ2 are obtained by referring to the data table stored in recording unit 10. Then, the information about the dermal tissue can be obtained by subtracting the sugar amount corresponding to displacement amount δ2 from the sugar amount corresponding to displacement amount δ1 or by dividing the two sugar amounts.

Furthermore, in the biological component measurement method of the first embodiment, the plurality of modulation frequencies are changed in order from the low frequency to the high frequency. In the example of FIG. 3, the three modulation frequencies are changed in the order of first frequency f1, second frequency f2, and third frequency f3. As illustrated in FIG. 1, in the configuration in which optical chopper 11 is used to modulate the intensity of excitation light 6, there is a problem that it takes more time to adjust the chopping frequency when the chopping frequency is changed from the high frequency to the low frequency than when the chopping frequency is changed from the low frequency to the high frequency due to a structure of a motor or the like in optical chopper 11. In one example, it takes about several seconds to change the chopping frequency from the low frequency to the high frequency, whereas it takes about several 10 seconds to change the chopping frequency from the high frequency to the low frequency. In the first embodiment, the modulation frequency is changed in the order from the low frequency to the high frequency, so that the modulation frequency can be quickly changed. Thus, the measurement efficiency of the biological component can be improved.

Furthermore, in order to accurately measure the biological component, sample 5 is required to be disposed at the optimum position where the absorption heat of sample 5 is stably and efficiently transferred to optical medium 3. Accordingly, at the start of measurement, step (S1) of adjusting the position of sample 5 on second surface 32 (sample placement surface) of optical medium 3 is performed.

In the position adjustment of sample 5, displacement amount δ of probe light 7 is obtained using light position detector 4 while sample 5 is irradiated with excitation light 6 intensity-modulated at a predetermined frequency. The optimum position of sample 5 on the sample placement surface is determined by searching for the position where obtained displacement amount δ is maximized. At this point, because the absorption heat of sample 5 becomes smaller as the modulation frequency becomes higher, the absorption heat of sample 5 is not sufficiently transmitted to optical medium 3, and it becomes difficult to determine whether the position of sample 5 is optimal. As a result, there is a possibility that measurement accuracy is degraded.

In the biological component measurement method of the first exemplary embodiment, at the start of measurement, excitation light 6 is intensity-modulated at the low modulation frequency (first frequency f1 in the example of FIG. 3), whereby the absorption heat of sample 5 can be increased. Accordingly, whether the position of sample 5 is optimal can be easily determined based on displacement amount δ of probe light 7. When sample 5 is disposed at the optimum position, the measurement accuracy can be improved.

Second Embodiment

Figure 5:
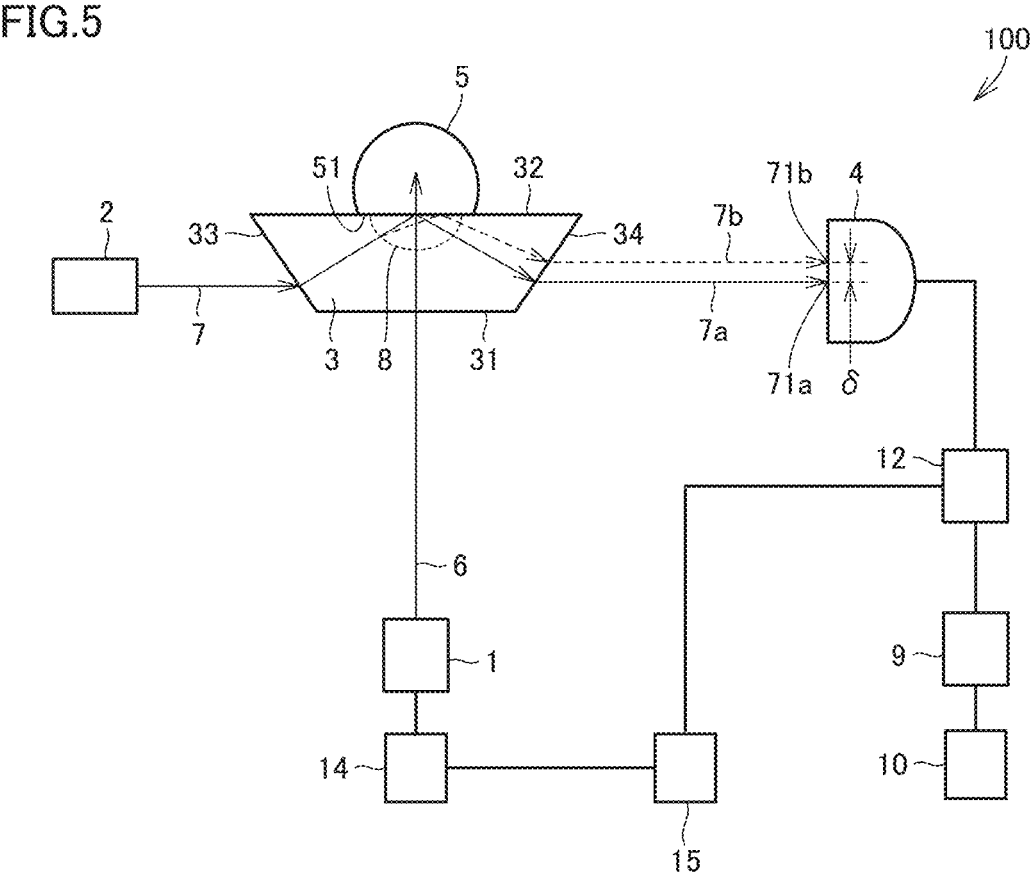
FIG. 5 is a view illustrating a configuration of a biological component measurement device according to a second embodiment.

FIG. 5 is a view illustrating a configuration of a biological component measurement device according to a second embodiment. Biological component measurement device 100 of the second embodiment is different from biological component measurement device 100 in FIG. 1 in that a modulator 15 is provided instead of optical chopper 11 and oscillator 13.

Modulator 15 is connected to power supply 14 and lock-in amplifier 12. Modulator 15 generates the intermittent signal (pulse signal) that is turned on and off at the cycle corresponding to the set modulation frequency. Power supply 14 controls power supply and interruption to excitation light source 1 according to the output signal provided from modulator 15. Specifically, power supply 14 supplies the power to excitation light source 1 during the on period of the output signal of modulator 15, and interrupts the supply of the power to excitation light source 1 during the off period of the output signal. Excitation light source 1 generates the intermittent light (pulse light) at the cycle corresponding to the modulation frequency by the power intermittently supplied from power supply 14.

For example, a signal generator is applied to modulator 15. However, modulator 15 is not limited to the signal generator, but may be any device capable of modulating an electric signal. Although the configuration in which power supply 14 supplies the current or the voltage modulated according to the output signal of modulator 15 to excitation light source 1 has been exemplified, power supply 14 and modulator 15 may be integrated using a power supply having a modulation function.

Lock-in amplifier 12 selectively amplifies the signal synchronized with the modulation frequency among signals related to the position of probe light 7 output from light position detector 4 based on the signal given from modulator 15. This makes it possible to remove the noise contained in the signal related to the position of probe light 7 output from light position detector 4. Thus, similarly to biological component measurement device 100 of the first embodiment, the biological component can be measured with improved accuracy.

Because biological component measurement device 100 in FIG. 1 includes optical chopper 11 and the drive mechanism thereof, there is a concern that biological component measurement device 100 becomes large in size and occupies a large installation space.

According to biological component measurement device 100 of the second embodiment, because the configuration in which the output signal of power supply 14 to excitation light source 1 is modulated is adopted, optical chopper 11 is not required to be provided between excitation light source 1 and optical medium 3. As a result, miniaturization and space saving of biological component measurement device 100 can be implemented.

It should be considered that the disclosed embodiment is an example in all respects and not restrictive. The scope of the present disclosure is defined by not the description above, but the claims, and it is intended that all modifications within the meaning and scope of the claims and their equivalents are included in the present invention.

REFERENCE SIGNS LIST

1: excitation light source, 2: probe light source, 3: optical medium, 4: light position detector, 5: sample, 6: excitation light, 7: probe light, 71a: first position, 71b:

second position, 8: refractive index gradient region, 9: biological component acquisition unit, 10: recording unit, 11: optical chopper, 12: lock-in amplifier, 13: oscillator, 14: power supply, 15: modulator, 100: biological component measurement device, δ: displacement amount

The invention claimed is:

1. A biological component measurement device comprising:
an optical medium to include a sample placement surface;
an excitation light source to emit excitation light traveling in the optical medium toward a sample placed on the sample placement surface;
a probe light source to emit probe light traveling in the optical medium;
a light position detector to detect a position of the probe light emitted from the optical medium;
a biological component acquisition unit connected to the light position detector; and
a modulation unit to modulate intensity of the excitation light and to make the excitation light incident on the optical medium,
wherein
in plan view of the sample placement surface, an optical path of the probe light in the optical medium overlaps a portion of the sample placement surface irradiated with the excitation light,
the modulation unit is configured to switch a plurality of modulation frequencies in order from a low frequency to a high frequency, and the plurality of modulation frequencies include a first frequency and a second frequency higher than the first frequency,
the light position detector detects a position of the probe light when the sample is irradiated with the excitation light intensity-modulated at the first frequency, and detects a position of the probe light when the sample is irradiated with the excitation light intensity-modulated at the second frequency, and
the biological component acquisition unit measures a biological component of the sample based on the position of the probe light at the first frequency and the position of the probe light at the second frequency.

2. The biological component measurement device according to claim 1, wherein the modulation unit includes an optical chopper disposed in an optical path of the excitation light,
the biological component measurement device further comprising:
a lock-in amplifier connected to the optical chopper and the light position detector; and
an oscillator to set operating frequencies of the optical chopper and the lock-in amplifier.

3. The biological component measurement device according to claim 2, wherein
the lock-in amplifier generates a signal related to a displacement amount of the probe light, the displacement amount being a distance between a first position of the probe light when the sample is not irradiated with the excitation light and a second position of the probe light when the sample is irradiated with the excitation light, and
the biological component acquisition unit measures the biological component of the sample based on a first displacement amount of the probe light that is a distance between the first position and the second position at the first frequency and a second displacement amount of the probe light that is a distance between the first position and the second position at the second frequency.

4. The biological component measurement device according to claim 1, wherein the modulation unit includes a modulator to modulate an output signal of a power supply to the excitation light source,
the biological component measurement device further comprising a lock-in amplifier connected to the modulator and the light position detector.

5. The biological component measurement device according to claim 4, wherein
the lock-in amplifier generates a signal related to a displacement amount of the probe light, the displacement amount being a distance between a first position of the probe light when the sample is not irradiated with the excitation light and a second position of the probe light when the sample is irradiated with the excitation light, and
the biological component acquisition unit measures the biological component of the sample based on a first displacement amount of the probe light that is a distance between the first position and the second position at the first frequency and a second displacement amount of the probe light that is a distance between the first position and the second position at the second frequency.

6. A biological component measurement method for measuring a biological component of a sample, the biological component measurement method comprising:
setting a modulation frequency in intensity modulation of excitation light to a first frequency;
detecting a position of probe light emitted from an optical medium while emitting the probe light traveling in the optical medium and irradiating the sample placed on a sample placement surface of the optical medium with the excitation light intensity-modulated at the first frequency;
changing the modulation frequency in the intensity modulation from the first frequency to a second frequency higher than the first frequency;
detecting the position of the probe light emitted from the optical medium while emitting the probe light traveling in the optical medium and emitting the excitation light intensity-modulated at the second frequency toward the sample placed on the sample placement surface of the optical medium; and
measuring the biological component of the sample based on the position of the probe light at the first frequency and the position of the probe light at the second frequency.

7. The biological component measurement method according to claim 6, further comprising adjusting a position of the sample on the sample placement surface while emitting the probe light traveling in the optical medium and irradiating the sample placed on the sample placement surface of the optical medium with the excitation light intensity-modulated at the first frequency.

8. The biological component measurement method according to claim 7, further comprising:
detecting a first displacement amount of the probe light, the first displacement amount being a distance between a first position of the probe light when the sample is not irradiated with the excitation light and a second position of the probe light when the sample is irradiated with the excitation light intensity-modulated at the first frequency;

detecting a second displacement amount of the probe light, the second displacement amount being a distance between the first position and the second position of the probe light when the sample is irradiated with the excitation light intensity-modulated at the second frequency; and measuring the biological component of the sample based on the first displacement amount and the second displacement amount.

9. The biological component measurement method according to claim 6, further comprising:

detecting a first displacement amount of the probe light, the first displacement amount being a distance between a first position of the probe light when the sample is not irradiated with the excitation light and a second position of the probe light when the sample is irradiated with the excitation light intensity-modulated at the first frequency;

detecting a second displacement amount of the probe light, the second displacement amount being a distance between the first position and the second position of the probe light when the sample is irradiated with the excitation light intensity-modulated at the second frequency; and measuring the biological component of the sample based on the first displacement amount and the second displacement amount.

* * * * *